United States Patent [19]

Lancaster

[11] 4,208,996
[45] Jun. 24, 1980

[54] HEATER FOR PRE-HEATING FUEL

[75] Inventor: Arthur Lancaster, Layfayette Hill, Pa.

[73] Assignee: The Budd Company, Troy, Mich.

[21] Appl. No.: 967,523

[22] Filed: Dec. 7, 1978

[51] Int. Cl.² ............................................. F02M 31/00
[52] U.S. Cl. ................................ 123/122 E; 123/133;
165/51; 165/52
[58] Field of Search .............. 123/122 E, 133; 165/51,
165/52, 164, 165

[56] References Cited

U.S. PATENT DOCUMENTS

| 1,966,133 | 7/1934 | Pieper | 165/164 |
|---|---|---|---|
| 3,354,872 | 11/1967 | Gratzmuller | 123/122 E |
| 3,472,214 | 10/1969 | Moon | 123/122 E |
| 3,892,212 | 7/1975 | Iamai | 165/52 |
| 3,892,214 | 7/1975 | Heidacker | 165/52 |
| 4,091,782 | 5/1978 | Dunman | 165/51 |

FOREIGN PATENT DOCUMENTS

| 19366 | 9/1909 | Norway | 165/52 |
|---|---|---|---|
| 616120 | 1/1949 | United Kingdom | 165/52 |

Primary Examiner—Ronald H. Lazarus
Attorney, Agent, or Firm—A. L. Truex, Jr.

[57] ABSTRACT

A heater for preheating fuel includes a housing having a partition therein to form two chambers. Heated liquid fluid is passed through one of the chambers and the fuel is passed through the other chamber. The heat from the heated liquid is transmitted through the partition to the fuel.

10 Claims, 4 Drawing Figures

HEATER FOR PRE-HEATING FUEL

Sub-zero temperatures pose special problems, especially for diesel engines. The low temperatures generally cause wax formations in the fuel used to drive the engine. These wax formations, in the form of flakes, tend to clog up the filters used in the fuel flow system to prevent proper operation of the engine. Because of this, preheaters have been used to preheat the fuel before it is applied to the engine to prevent wax build up and clogging of the filters in the system.

Preheaters have taken various different forms. In general, such preheaters make use of the hot water in the radiator of the vehicle system. In one such heater, fuel is passed through an inner pipe or tubing. The hot water is passed through an outer larger pipe which jackets the inner pipe. The hot water in the outer larger pipe heats the fuel in the inner pipe and as it passes therethrough.

In the above system, the tubing used is generally copper between brass headers connected within a brass housing. The system has proven expensive and it is possible that copper and brass may affect the chemistry of the fuel.

Most preheaters used heretofore have involved welded joints between the hot water source and the fuel to be heated. If one of the welds breaks and water enters the fuel, the engine may be considerably damaged.

Another problem encountered in some prior art fuel preheaters is that the temperature of the fuel may be raised to too high a temperature. If the temperature of the fuel goes too high, over 160° F., for example, the horsepower in the engine starts to drop.

It is an object of this invention to provide an improved tank for preheating fuel which is economical to manufacture.

It is a further object of this invention to provide an improved preheater for heating diesel fuel in which the danger of the fuel mixing with the heating fluid because of defective weld joints is minimized.

It is still a further object of this invention to provide an improved preheater for diesel fuel in which the maximum temperature to which the fuel can rise is limited.

In accordance with the present invention, heater for heating fuel includes a pair of shell members with a divider member connected forming two chambers. Conduit means are provided to pass heating fluid through one of the chambers and the fuel through the other chamber. Heat from said heating fluid is transmitted through the divider member to heat the fuel.

Other objects and advantages of the present invention will be apparent and suggest themselves to those skilled in the art, from a reading of the following specification and claims, taken in conjunction with the accompanying drawings, in which:

Figure 1:
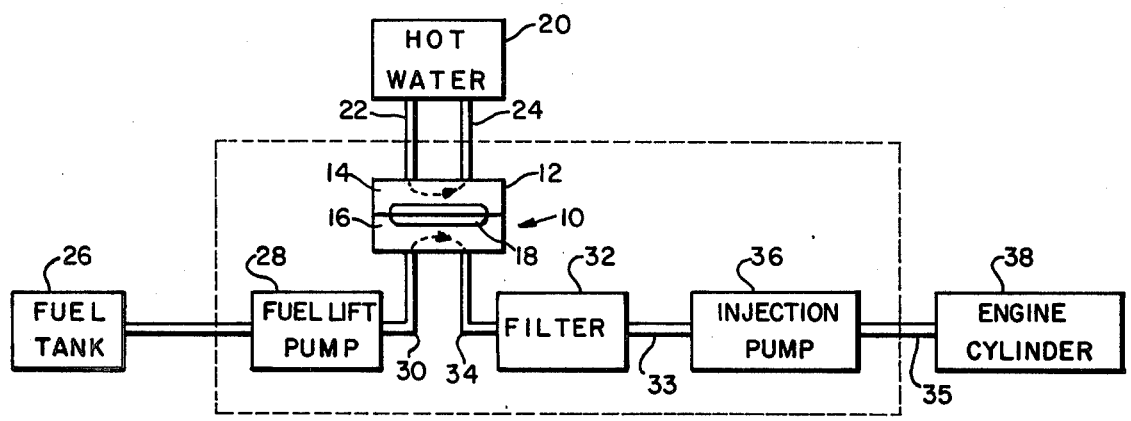
FIG. 1 is a block diagram illustrating a system including a heater of the type involving the present invention.

Referring particularly to FIG. 1, a system in which the present invention may be used includes the heater 10 comprising a housing 12 divided into first and second chambers 14 and 16 by a divider member 18.

Hot water, which may be from the radiator used with the diesel engine system of the vehicle, is circulated by a pump or other suitable means from a source 20 through inlet and outlet conduits 22 and 24. The hot water is circulated in and out of the chamber 14, as indicated by the direction of an arrow.

Fuel to be preheated is supplied from a fuel tank 26. A fuel lift pump 28 forces the fuel into the chamber 16 through an inlet conduit 30. While the fuel is passing through the chamber 16, it is heated by the hot water passing through the chamber 14. The divider member 18 is highly conductive of heat to permit the heat from the hot water to be transmitted into the chamber 16 to heat the fuel passing therethrough.

The heated fuel in the chamber 16 passes to a filter 32 through an outlet conduit 34, as indicated by the direction of the arrow. Because the fuel is heated, the tendency of wax building up in the fuel is minimized and the filter 32 will not tend to clog. Thus the heated fuel passes freely through the filter 32.

Finally, the heated fuel is passed through a suitable conduit 33 from the filter 32 through an injection pump 36 and through conduit 35 into the engine cylinders 38. The various components illustrated by blocks are conventional and found in many diesel engine systems. Consequently, the details relating thereto are not illustrated or described because they are only incidentally related to the present invention. Only the heater 10 is related particularly to the invention.

Figure 2:
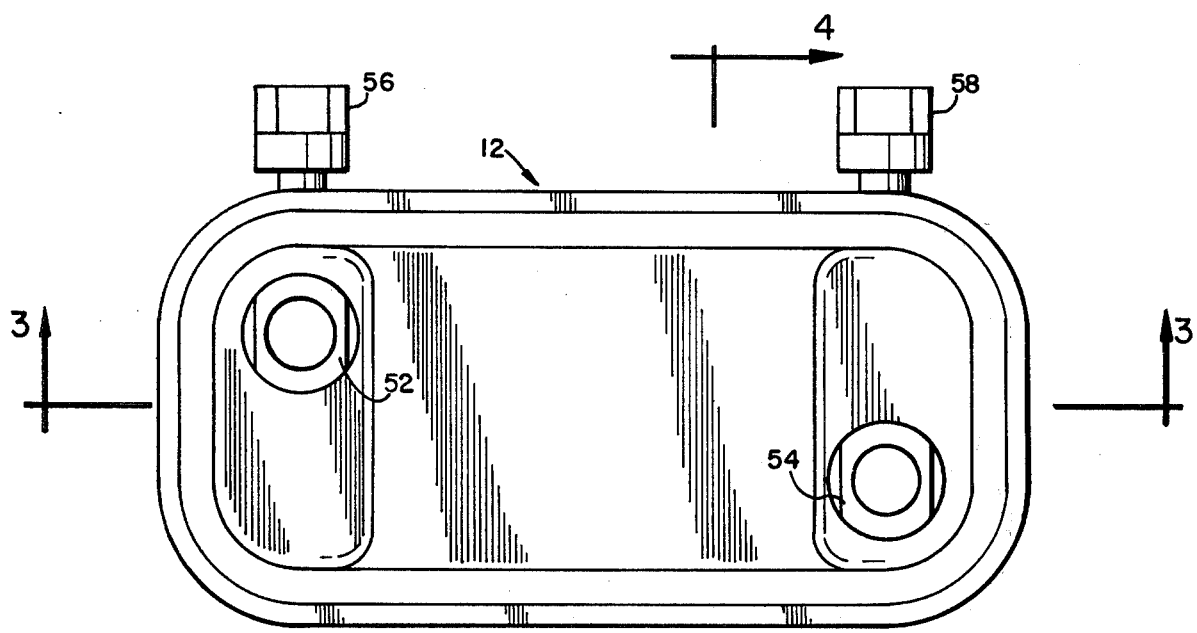
FIG. 2 is a top view of a heater, in accordance with the present invention.
Figure 3:
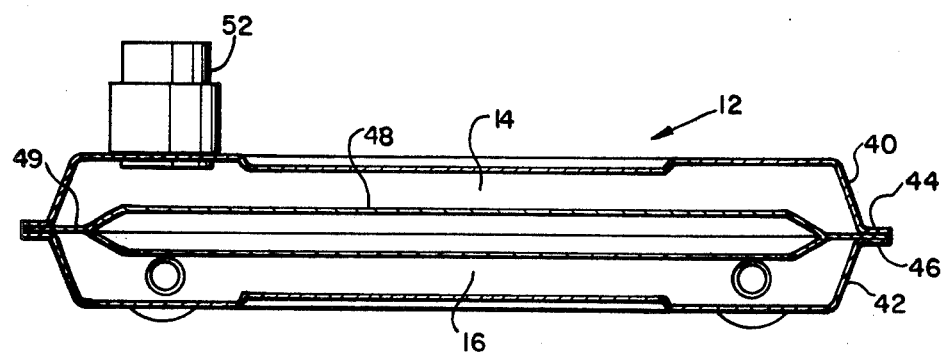
FIG. 3 is a cross-sectional view taken along lines 3—3 of FIG. 2.
Figure 4:
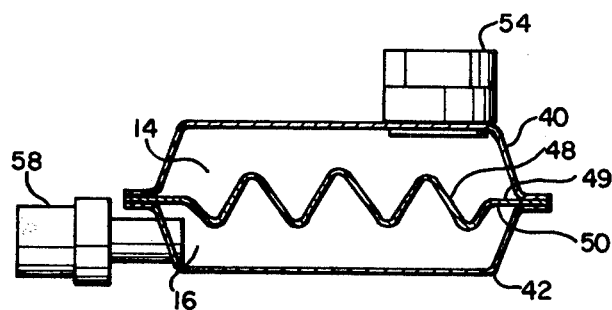
FIG. 4 is a cross-sectional view taken along lines 4—4 of FIG. 2.

Referring to FIGS. 2, 3 and 4, the heater housing 12 comprises two substantially identical metal shells 40 and 42 made of a material other than copper, such as aluminum or steel. The shells may be formed by a punch press operation, with suitable openings for the conduit connections being punched or otherwise formed therein. The shells 40 and 42 are formed with flanges 44 and 46 about their peripheries. The shells 40 and 42 are preferably made identical to minimize the cost of manufacture.

A corrugated metal divider member or panel 48 also includes a flat flange 49 about its periphery. The flanges of the shell members and divider members are dimensioned to the same size so that they align with each other in layers after assembly prior to welding. The corrugations in the divider member provides a greater area for transfer of the heat from the chamber 14 to the chamber 16. The two shells 40 and 42 and the divider member 48 are joined together by seam welding together with the aligned flanges 44, 46 and 48. Of course, any other suitable method of joining may be used.

When the shells 40, 42 and divider member 48 are joined together, the chambers 14 and 16 are formed, with the shell 40 and divider member 48 forming the chamber 14 and the shell 42 and divider member 48 forming the chamber 16.

After suitable openings have been formed in the shells 40 and 42, generally before assembly with the divider member 48, adapter elements 52 and 54 are connected by welding threaded connections or by other suitable means to top openings in the shell 40. In like manner, adapter elements 56 and 58 are connected to openings in the rear sidewall of the shell 42.

The adapter elements 52 and 54 provide connections to permit conduits 22 and 24 (FIG. 1) to be connected to conduct the hot water from the source 20 into and out of the chamber 14 of the heater 10. In like manner, the adapter elements 56 and 58 provide connections for the conduits 30 and 34 (FIG. 1) to permit the fuel from the pump 28 to pass through the chamber 16 to the filter 32.

The shells 40 and 42 are formed with central depressions 60 and 62, respectively, so that the top peripheral edges of the shells form rib like areas for added strength.

An advantage of the assembly illustrated is that if any of the weld joints break to cause either the hot water or fuel to leak, it will leak to the outside of the housing. There are no weld joints directly joining the hot water chamber 14 with the fuel chamber 16. Consequently, there is no danger that the water will mix with the fuel to cause damage to the engine.

Another advantage of the preheater illustrated is that the shell 42 forming the chamber 16 with the divider 48 and which contains the fuel has its outside surface exposed to ambient temperature. As long as the fuel put into the chamber 16 is colder than the hot water in the chamber 14, the temperature of the fuel will rise. As the fuel temperature comes up to and gets close to the temperature of the hot water, the fuel transmits as much heat through the shell 42 as it receives from the hot water in the chamber 14. At some limit, about 150° F., for example, the temperature of the fuel stops rising.

The limit in the rise in the temperature of the fuel assures that the engine will not lose horsepower during operation. The temperature limit is provided with no need for a shutoff device or valve. This eliminates the need, for example, of an operator of a vehicle hauling fruit from Florida to Canada in the winter from turning devices on and off as he passes from a hot climate to a cold climate.

What is claimed is:

1. A fuel heater for a diesel engine for heating a fuel having wax flakes precipitated therein at reduced temperatures, said fuel being heated in a heat exchanger by a heated liquid, said heat exchanger comprising:
   (a) a pair of identical shell members,
   (b) a divider member adapted to cooperate with said shell members,
   (c) means for securing said shell members to opposite sides of said divider member to form said heat exchanger having separate first and second chambers;
   (d) inlet and outlet means connected to said shell member forming said first chamber and interconnected with a source of heated liquid for passing a heated liquid through said first chamber,
   (e) second inlet and outlet means connected to said shell member forming said second chamber and interconnected in a fuel system of a diesel engine between a fuel tank and fuel filter for passing said fuel through said second chamber and heat the fuel above the precipitation temperature of the wax flakes as it flows into and out of said second compartment, whereby the heat from said heating fluid is transmitted through said divider member to heat said fuel.

2. A heater as set forth in claim 1 wherein said means for securing comprise outer aligned flanges on said shell and divider members to permit direct joining of said flanges.

3. A heater as set forth in claim 2 wherein said divider member comprises a corrugated area for transmitting heat from said first chamber into said second chamber.

4. A heater as set forth in claim 3 wherein said flanges of said shell members and said divider member are joined together by seam welding.

5. A heater as set forth in claim 4 wherein said heated liquid passing through said first chamber comprises hot water from a radiator of said diesel engine.

6. A heater as set forth in claim 5 wherein said fuel passes from said second chamber through a filter to the cylinders of said diesel engine.

7. A heater as set forth in claim 6 wherein the fuel to be heated passes from a fuel tank, through a fuel lift pump, through said second chamber, through a filter and injection pump to said cylinders.

8. A heater as set forth in claim 7 wherein said shells and divider members are aluminum.

9. A heater as set forth in claim 8 wherein said shell members include recesses therein to provide added strength thereto.

10. A heater as set forth in claim 7 wherein said shells and divider members are steel.

* * * * *